Figure 5:
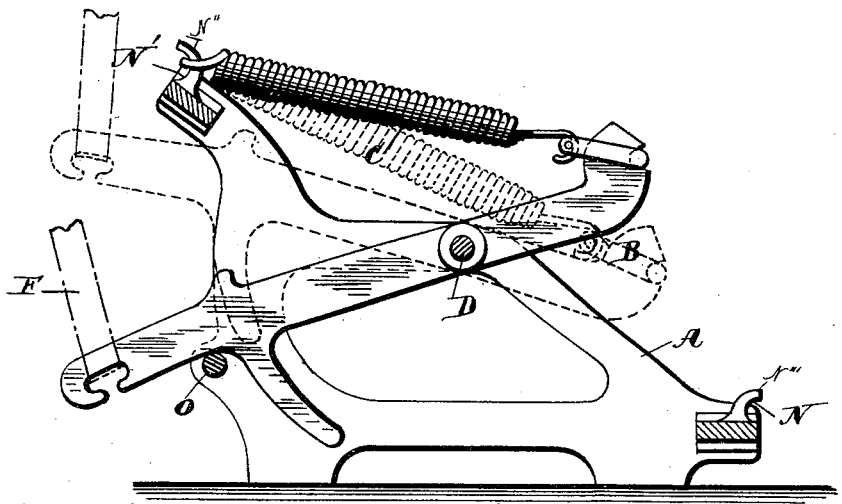

(No Model.) 2 Sheets—Sheet 1.
G. W. STAFFORD & S. D. BARRETT.
HARNESS DEPRESSING DEVICE FOR LOOMS.
No. 388,319. Patented Aug. 21, 1888.
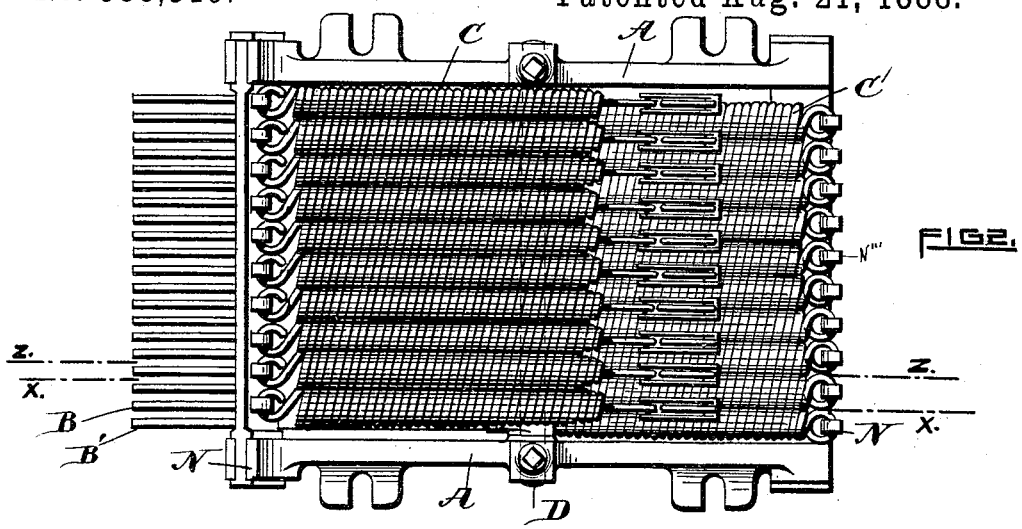
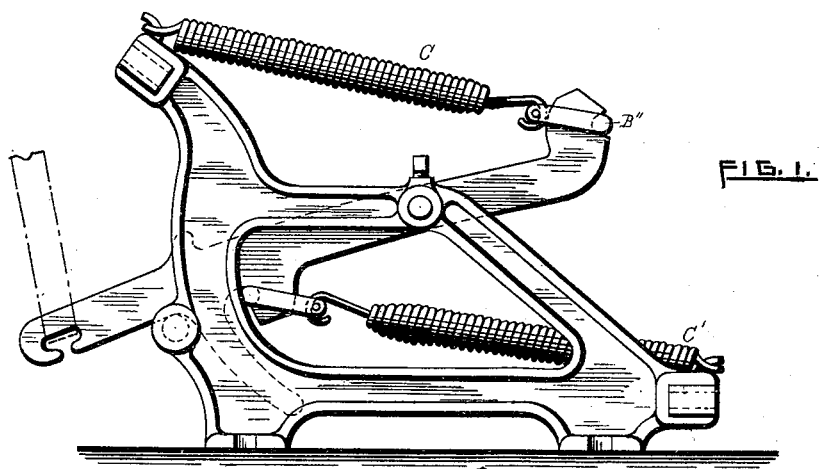
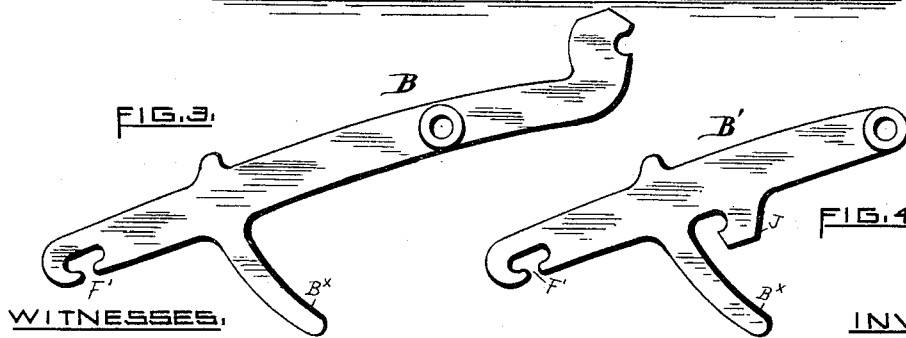
WITNESSES. INVENTORS (No Model.) 2 Sheets—Sheet 2.

G. W. STAFFORD & S. D. BARRETT.
HARNESS DEPRESSING DEVICE FOR LOOMS.

No. 388,319. Patented Aug. 21, 1888.

WITNESSES.
James E. Arnold.
M. C. Arnold.

INVENTORS
Geo. W. Stafford
Saml. D. Barrett
By Benj. Arnold. Atty.

UNITED STATES PATENT OFFICE.

GEORGE W. STAFFORD AND SAMUEL D. BARRETT, OF PROVIDENCE, RHODE ISLAND, ASSIGNORS TO THE GEO. W. STAFFORD MANUFACTURING COMPANY, OF SAME PLACE.

HARNESS-DEPRESSING DEVICE FOR LOOMS.

SPECIFICATION forming part of Letters Patent No. 388,319, dated August 21, 1888.

Application filed October 31, 1887. Serial No. 253,807. (No model.)

*To all whom it may concern:*

Be it known that we, GEORGE W. STAFFORD and SAMUEL D. BARRETT, of Providence, in the county of Providence and State of Rhode Island, have invented certain new and useful Improvements in Harness-Depressing Devices for Looms; and we do hereby declare that the following is a full, clear, and exact description thereof, reference being had to the accompanying drawings, and to the letters of reference marked thereon, which form a part of this specification.

This invention relates to the devices, sometimes called "spring-jacks," used for drawing down the heddle-frames or harnesses in looms after they are raised by the dobby. Its object is to so vary the effects of the springs that draw the harnesses down as to lessen the strain and wear on the parts that raise them, and at the same time make sure of their going clear down and staying there until they are raised again by the dobby.

Heretofore one difficulty has been that where many harnesses were used, and consequently brought close together, a harness in rising was liable to raise another a little ways by the friction of the threads on one another and between the harnesses, and so disturb the level position of the warp-threads over which the shuttle passes. In using springs without the intervention of levers for the purpose of depressing harnesses in looms the power exerted by the spring on the harness increases as the frame ascends and is at its greatest strength when the harness is up, and the return of the harness to its lowest or normal position is retarded by the slackening of the strain of the spring, so as to make its complete descent uncertain. In our spring-jack these conditions are reversed, the upward motion of the harness being facilitated by the slackening up of the spring, and the downward motion accelerated by the increased pull of the spring through the levers. This is accomplished by so constructing and arranging the springs and the levers through which they operate on the harnesses that the strain of the spring shall be at its maximum when the harness is clear down, and gradually lessened as it rises, until at its highest position the draft of the spring on the harness will be very light and put as little work on the raising mechanism as possible and enable the loom to run at a higher speed.

Attempts more or less successful have heretofore been made to accomplish these results, but faults in the construction and arrangement of the parts have stood in the way of their introduction into general use. By making one-half of the levers of a different shape from the others and using the springs in two sets we are able to construct depressing devices to work a given number of harnesses that will not occupy more than one-half the usual space.

It is an essential point that each lever should be directly under the harness to which it is connected, and the whole set of levers should not cover more space from front to back than the harnesses do in that direction. Our plan also reduces the weight nearly one-half, thereby reducing the cost of the jack. It is illustrated in the accompanying drawings.

Figure 6:
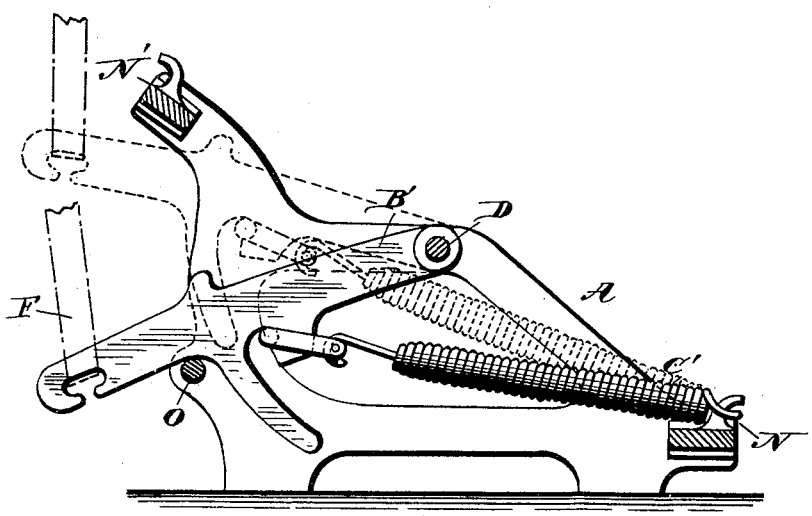

Figure 1 shows an elevation of our harness-depressing devices. Fig. 2 is a top view of the same. Fig. 3 represents one of the two forms of levers used. Fig. 4 shows the shape of the other levers. Fig. 5 is a vertical transverse section of the spring-jack, taken on line $x\,x$, Fig. 2, the levers B' and spring C' being omitted. Fig. 6 is a vertical transverse section taken on the line $z\,z$ of Fig. 2, omitting levers B and spring C.

Two small upright side frames, A A, are placed at a proper distance apart according to the number of harnesses to be operated, and secured to each other by the cross-bars N N', which also carry the hooks N'' N''', that hold the stationary ends of the springs. There is also placed across the frame a bar, O, which is placed under the long ends of the levers, and the shaft D in the upper part of the machine, which serves as a stationary shaft for the levers B B' to swing on. The shapes of the two kinds of levers used are shown in Figs. 3 and 4, and also in Figs. 5 and 6. The two kinds of levers are placed alternately side by side on the shaft D, every alternate lever extending out beyond the shaft. Each of the long levers B, Fig. 5, has a close spiral spring, C, attached to its short end by means of a stirrup, B'', into which the end of the spring is hooked, while the other end of the spring is caught over a hook, N'', on the cross-bar N'. The other levers, B', do not extend back beyond their hubs on the shaft D, Fig. 6, but have hooks J, made on their under sides, which hold the stirrups B'', into which one end of the springs C' are hooked, the other end being held by the hooks N''' on the bar N.

As will be seen by reference to Fig. 2, the springs C C' take up more room laterally than the levers do; but by making two kinds of levers and two sets of springs and arranging the levers alternately one half the room usually occupied is saved.

An open notch, F', is made in the under side of the free end of each lever to receive the strap F L, that connects it to the harness. A curved projection, B*, cast on the lower side of each lever, is to prevent them from overriding one another when raised.

By referring to Figs. 5 and 6 it will be seen that the levers and springs are so arranged that when the free end of a lever is raised (see dotted lines) the inner end of a spring, C', or the outer end of a spring, C, will be moved toward the shaft D, bringing the draft on the spring more and more in line with the lever, and the purchase of the lever will be increased in this way much faster than the strain on the spring. Consequently, the higher that end of the lever is raised the easier it is moved and the less it will pull down on the harness. By this arrangement the draft on the harness will be least when clear up, increasing as it goes down, thereby making sure of its going clear down and staying there until raised again by the dobby.

Of course, it is desirable to run the loom with as little downpull on the harnesses as will work them, as it will require less power and the loom can be run faster. This strain of the lever on the harness can be lessened by shortening up the strap that connects it to the harness, so that the lever shall start at a higher point and work through a higher space, in which, as above shown, the spring will have less power over it.

Having thus described our improvements, what we claim as our invention is—

The combination, with the frames A, cross-bars N N', and shaft D, of a series of levers, B B', placed side by side on said shaft, every alternate lever being extended out beyond the shaft to receive the connections of an upper series of springs, C, and the intermediate levers having catches J on their under sides between the shaft D and their ends, to hold connections for a lower series of springs, C', and the springs C C', substantially as and for the purpose set forth.

GEO. W. STAFFORD.
SAMUEL D. BARRETT.

Witnesses:
WILLIS I. WORK,
BENJ. ARNOLD.